Patented May 22, 1945

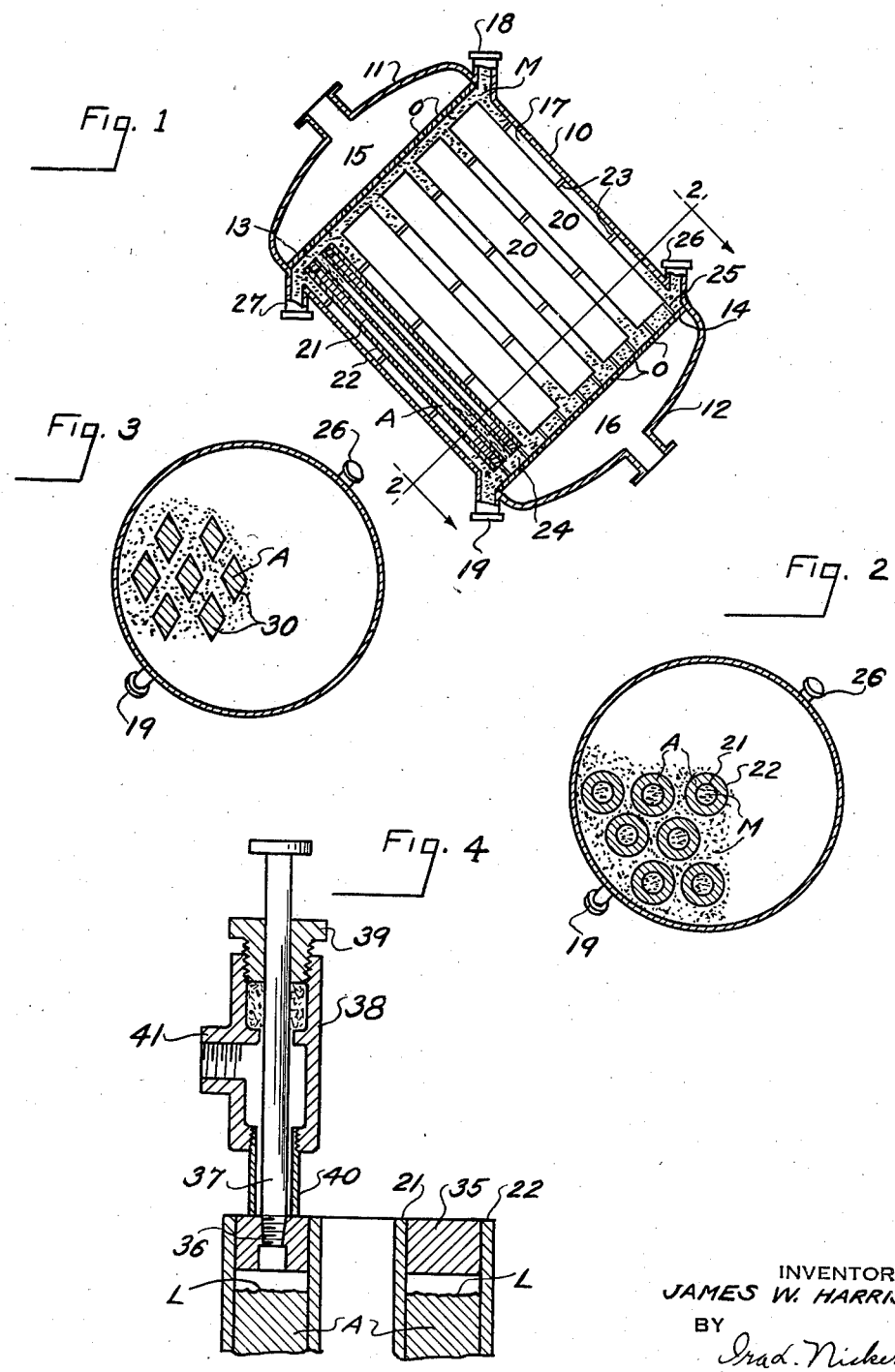

2,376,356

UNITED STATES PATENT OFFICE 2,376,356

TEMPERATURE CONTROL OF CATALYTIC OPERATIONS

James W. Harrison, Woodbury, N. J., assignor to Houdry Process Corporation, Wilmington, Del., a corporation of Delaware Application May 28, 1942, Serial No. 444,865

1 Claim. (Cl. 23—288)

This invention relates to contacting operations involving the use of solid contact materials for promoting, controlling or in any way assisting in the direction or extent of organic reactions.

In utilizing a body of contact material to obtain a desired product from a starting material and particularly when the starting material contains hydrocarbons, the contact material will acquire a deposit which must be removed to place it in condition for further use. After a period of productive use air or other oxygen-containing medium is supplied in heated condition to the contact material in order to effect a burning of the deposit to remove the same and place the material in regenerated condition for a later period of productive use. During the period on stream or the productive period of operation it may be necessary to supply heat to or remove heat from the material, depending upon the type of reaction being carried out, and during the regeneration period varying amounts of heat must be removed since this reaction is exothermic and the contact material might otherwise be deleteriously affected by becoming overheated. It is necessary, therefore, to regulate the temperature of the contact material during its use, either in the established commercial "in situ" operation or in proposed continuous moving contact material operations.

Temperature control of the contact material has been carried out successfully by circulating a medium which remains fluid during use, such as mercury, diphenyl, fused salts or a gaseous medium, for example, steam, in indirect heat exchange relation with the contact material. However, the equipment required for these methods of temperature control is quite expensive and requires a reaction converter with complicated fluid manifolds and tube structures to effect the circulation of the fluid, which auxiliary equipment makes it difficult to remove the contact material from the converter when it is required to be replaced with new material. Also the zones of contact material around the heat exchange fluid tubes may vary in temperature lengthwise of the tubes due to the increase or decrease of the sensible heat of the tubes and fluid flowing therein and consequently the temperature differenc between the inlet and outlet ends of the bed of contact matrial in the reaction chamber may be so great as to interfere with the cycle of on-stream and regeneration operation.

It is the broad object of the present invention to improve on the means and manner of temperature control of a body of contact material. Another object of the invention is to construct a converter which is adapted particularly for use with solid contact material. Another object is to arrange the various converter elements so as to insure uninterrupted flow of contact material through the reaction chamber. Another object is to provide for close temperature control of all portions of the contact material. Another object is to provide a converter which is particularly useful for adiabatic operation of concomitant exothermic and endothermic reactions. Another object is to provide a novel tube for temperature control and a method of assembly.

The present invention involves converter construction adapted for the efficient utilization of a body of contact material which enters into or in any way effects a reaction. The general design of the converter is such that a moving body of contact material may be used therein as the various converter elements are arranged to provide for free flow of the material through the reaction chamber if this type of operation is desired. Preferably, the converter will be used with the contact mass "in situ" for cyclic on-stream and regeneration operation since it is particularly designed for close temperature control and the contact material can be used over extended periods of operation before it needs replacement by fresh material. The temperature control of the material is effected by means of stationary heat storage elements embedded therein providing contact material zones within the reaction chamber through which reactant fluid will pass during operation of the converter. The stationary elements may be solid or hollow and each will have sufficient heat storage capacity to control the temperature of the contact material in the zones adjacent thereto. The specific temperature control elements are designed to contain a fusible alloy having high heat storage capacity so that substantial amounts of heat can be absorbed during the exothermic period of operation. The hollow elements permit the fusible alloy to be enclosed by inner and outer walls so that the contact material zones will be adjacent both walls of the elements providing extensive heat exchange surface through which the heat transfer alloy of each element can function to control the temperature of the zones of contact material within and surrounding the elements which permits each element to be constructed with a large over-all surface and to be adapted particularly for large converters. The solid elements will have only an outer heat transfer surface through which the heat transfer alloy can function to control the zones of contact material surrounding the elements and ordinarily this type of element will be used with small converters or adjacent the borders of the body of contact material which are ordinarily difficult to control.

Various types of alloys may be used depending on the temperature range of the particular onstream and regeneration operating cycle. The apparatus is ideally suited to operate on an adiabatic cycle by selecting an alloy, the heat of fusion of which is such as to absorb all the exotherm during the regeneration period of the cycle and to give up the absorbed heat during the on-stream period of the cycle in order to maintain the temperature of the mass constant during the entire cycle. Other adiabatic operations may be carried out within a temperature range of 150° F. during the cycle of operation, for example, refining and desulphurizing reactions for petroleum distillates carried out in the temperature range of 750° to 850° F.; dehydrogenating and cracking reactions to produce lighter hydrocarbons such as motor fuel, aviation fuel, etc. may be effected within the temperature range of 850° to 975° F. and for more drastic dehydrogenating or cracking operations to produce gases of the unsaturated or olefinic type within a temperature range of 975° to 1075° F.

The following list of alloys will be found suitable for use in the apparatus in an adiabatic cycle of operation:

| Composition, wt. per cent | Melting point, °F. | Heat of fusion calc. |
|---|---|---|
| 80% Pb, 20% Na | 788 | |
| 70% Mg, 30% Al | 811 | 76.6 |
| 33% Mg, 67% Al | 838 | 82.0 |
| 34% Mg, 66% Pb | 858 | 28.2 |
| 72% Mg, 28% Ni | 950 | 72.3 |
| 23% Cu, 77% Sb | 995 | 39.6 |
| 33.8% Cu, 66.2% Al | 1,009 | 71.6 |
| 39.0% Cu, 61.0% Cd | 1,011 | 23.1 |
| 61% Mg, 39% Sn | 1,049 | 49.3 |
| 92.5% Al, 7.5% Ni | 1,152 | 85.8 |

For a clear understanding of the invention reference may be had to the accompanying drawing in which, Fig. 1 is a vertical sectional view, with some parts in elevation, of one form of apparatus for carrying out the invention;

Fig. 2 is a view taken on the line 2—2 of Fig. 1;

Fig. 3 is a view similar to Fig. 2, showing a modified form of the invention; and Fig. 4 is a sectional view showing a further detail of the invention.

Referring to Fig. 1, 10 indicates the side wall of the converter casing to which are secured, for example, by welding, upper and lower end walls 11 and 12, respectively. Between the end walls upper and lower partitions 13 and 14, respectively extend transversely of the casing providing upper and lower reactant fluid manifolds 15 and 16 and a central reaction chamber 17 for containing contact material M which may be of any known or desired type capable of effecting the desired transformation or treatment of the reaction fluid but is preferably in the form of bits, fragments, molded pieces or finely divided particles. The upper and lower partitions are apertured at O to provide communication between the reactant manifolds and the reaction chamber for the supply of reactants thereto or the removal of reactants from the reaction chamber. Directly below and adjacent the upper partition 13 a contact material inlet 18 is provided for supplying contact material to the reaction chamber 17 and directly above and adjacent the lower partition 14 contact material outlet 19 is provided for the removal of the contact material. The partitions 13 and 14 are disposed at an angle which is preferably slightly greater than the angle of repose of the contact material which is to be used in the reaction chamber so that the contact material will flow freely from the chamber 17 through the outlet 19 when it is desired to replace material after extended periods of use. If it is desired to use the converter with a continuously moving body of contact material passing through the reaction chamber as is disclosed in the application of Roger M. Newton, Serial No. 426,119, filed January 19, 1942, for Method and apparatus for the contact treatment of fluids, the apparatus elements disclosed in this application for maintaining an angularly disposed reaction chamber substantially full of contact material may be used.

The temperature of the contact material is controlled by a plurality of self-contained heat exchange elements 20 which may take the form of the element shown in section at the left side of Fig. 1. This particular type of element is made up of an inner conduit 21 and an outer conduit 22 which are concentrically disposed and sealed at the top and bottom and contain a fusible alloy A of any desired type suitable for controlling the temperature of the particular reaction being effected and which may be one of the alloys previously listed herein. The manner of forming this particular type of heat exchange element will be described later in connection with Fig. 4. The elements 20 may be disposed transversely of the reaction chamber and function to control the temperature of the zones of contact material surrounding each member, but, by preference, the elements are disposed longitudinally as indicated in Fig. 1 so that as the contact material is supplied to the reaction chamber 17 zones of the contact material will be formed within the inner conduit 21 and around the outer conduit 22, providing, in effect, extensive heat exchange surfaces since each element may then control inner and outer zones of contact material. Spacing pins 23 are provided for maintaining the elements in fixed position and, as indicated in Fig. 2, the elements will be symmetrically spaced from each other and so arranged that each element will function to control the zones of the contact material within its inner tube 21 and around its outer tube 22. In order to provide for unimpeded flow of the contact material from the converter a substantially free space 24 is provided between the lower ends of the tubes and the bottom partition 14 by means of spacing pins 25 and the outlet 19 will be positioned directly in communication with the space 24 for removing the material. It will usually be necessary in order to prevent overheating of the lower partition 14 to supply an inert material in the space 24 and this may be accomplished by providing an inlet 26 for the inert material in the converter casing at a point opposite the catalyst outlet 19, as is disclosed in the application of Eugene J. Houdry, Serial No. 437,687, filed April 4, 1942, for Contacting operations, and when it is desired to prevent overheating of the upper partition 13 the catalyst inlet 18 may be used to supply the inert material and cooperating outlet 27 positioned in the casing wall at a point opposite the inlet 18, following the teaching in the aforementioned application of E. J. Houdry.

Fig. 3 shows a modified form of a heat exchange tube which is so designed as to insure that equal zones of contact material are controlled by a heat exchange surface and that all surfaces are within a desired distance from all portions of the contact material, for example, to provide a heat exchange surface within an inch or half an inch of all portions of the contact material so that all portions are under close temperature control. The particular tubes shown for this feature of the invention are diamond-shaped to provide flat heat exchange surfaces but it is to be understood that various other tube configurations may be used following the teaching in the patent application of Leland W. T. Cummings, Serial No. 372,615, filed December 31, 1940, for Heat transfer method and apparatus. In this figure the tubes 30 are filled with the alloy selected for the particular temperature range of the specific on-stream and regeneration operation and, as indicated in the figure, the tubes will be disposed longitudinally of the reaction chamber in a manner similar to that described in connection with Figs. 1 and 2 and the reactants supplied to the upper and lower manifolds for passage longitudinally through the reaction chamber. If desired, the reactants may be supplied to the side wall of the casing and pass transversely of the reaction chamber in defined paths between the heat exchange tubes 30 in the manner disclosed in the above mentioned application of Leland W. T. Cummings.

In Fig. 4 apparatus is shown for evacuating and sealing the type of heat exchange element which is made up of concentric inner and outer tubes embodied in Figs. 1 and 2 and the method of operating the apparatus will be described only in connection with this double wall tube, but it is to be understood that this feature of the invention is applicable for the construction of solid tubes as well. The tubes 21 and 22 will be sealed by any suitable means at the bottom and will be filled with the chosen alloy A up to the level line L as indicated in Fig. 4, after which the assembled apparatus for evacuating the tube and sealing the same is applied to the upper open end of the tube. The apparatus comprises a sealing ring 35 having a screw threaded aperture 36 therein, in which is secured the lower screw threaded end of spindle 37. The spindle 37 is disposed within a housing generally indicated at 38 having at its upper end a stuffing box gland 39 and at its lower end a sealing tube 40. The spindle is positioned in registration with the aperture 36 of the sealing ring 35 and the tube 40 sealed to the ring, for example, by welding. In order to evacuate and seal the tube the sealing ring 35 is inserted into the open end of the tube and ring welded to its inner and outer walls 21 and 22, respectively. Air is evacuated from the space between the inner and outer walls by applying an air evacuator to the nozzle 41 of the housing 38 when the aperture 36 of the seal ring is open and after a suitable period of evacuation the spindle is then screwed tightly into the aperture to effect the seal. To complete the heat exchange element the sealing tube 40 and spindle 37 are cut off at their lower ends and, if desired or necessary, the portion of the spindle remaining in the aperture 36 may be ring welded to the sealing ring 35.

Although the various means of accomplishing the objects of the invention are shown in detail in the drawing, they are to be considered only exemplary and not limitative of the invention.

I claim as my invention:

A converter comprising a casing having top, bottom, and side walls, apertured upper and lower partitions extending transversely across the casing in generally parallel relation providing a reaction chamber therebetween for containing a mass of contact material and end manifolds in commuication with the reaction chamber, said partitions being disposed at an angle to the horizontal which is greater than the angle of repose of the contact material, an inlet adjacent the highest point of the upper edge of the upper partition for supplying contact material to the reaction chamber and an outlet adjacent the lowest point of the lower edge of the lower partition for removing contact material from the reaction chamber, a plurality of heat storage elements extending longitudinally of the reaction chamber and enclosed within the chamber for controlling the temperature of the contact material, spacing means between said heat storage elements for maintaining them in generally symmetrical alignment in the chamber and other spacing means between the lower ends of the elements and the lower partition providing a space to permit uninterrupted flow of the mass of contact material across said lower partition to said outlet for the removal of the contact material from the reaction chamber, means for supplying reactants to one of said manifolds for passage through the contact material and other means for removing reaction products from the other manifold.

JAMES W. HARRISON.